(12) United States Patent
Shaffer et al.

(10) Patent No.: US 10,009,389 B2
(45) Date of Patent: Jun. 26, 2018

(54) SCALABLE CONFERENCE BRIDGE

(71) Applicant: Cisco Technology, Inc., San Jose, CA (US)

(72) Inventors: Shmuel Shaffer, Palo Alto, CA (US); Labhesh Patel, San Francisco, CA (US); Mukul Jain, San Jose, CA (US); Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 14/216,641

(22) Filed: Mar. 17, 2014

(65) Prior Publication Data
US 2014/0198175 A1    Jul. 17, 2014

Related U.S. Application Data

(63) Continuation of application No. 11/649,528, filed on Jan. 3, 2007, now Pat. No. 8,675,847.

(51) Int. Cl.
*H04M 3/56* (2006.01)
*H04L 29/06* (2006.01)
(Continued)

(52) U.S. Cl.
CPC ...... *H04L 65/1093* (2013.01); *H04L 12/1818* (2013.01); *H04L 12/1877* (2013.01);
(Continued)

(58) Field of Classification Search
CPC ................ H04M 3/56; H04M 3/567; H04M 2203/5009; H04L 65/1093; H04L 12/1818; H04L 12/1877; H04L 65/403
(Continued)

(56) References Cited

U.S. PATENT DOCUMENTS

| | | | |
|---|---|---|---|
| 4,460,807 A | * | 7/1984 | Kerr .................... H04M 3/56 379/205.01 |
| 4,890,257 A | | 12/1989 | Anthias et al. |

(Continued)

FOREIGN PATENT DOCUMENTS

| | | |
|---|---|---|
| CN | 101055561 | 10/2007 |
| CN | 102572370 | 7/2012 |

(Continued)

OTHER PUBLICATIONS

International Search Report and Written Opinion dated May 5, 2008 from corresponding PCT Application No. PCT/US07/87530.
(Continued)

*Primary Examiner* — Ahmad F Matar
*Assistant Examiner* — Jirapon Intavong
(74) *Attorney, Agent, or Firm* — Polsinelli PC

(57) ABSTRACT

In one embodiment, a conference bridge receives a call initiated by a first caller endpoint. The conference bridge identifies a conference to which the call requests entry and determines whether the conference bridge has available resources to process the call. The conference bridge enables the call to join the conference via a second conference bridge associated with a second caller endpoint participating in the conference according to whether the conference bridge has available resources to process the call.

20 Claims, 5 Drawing Sheets

(51) Int. Cl.
*H04L 12/18* (2006.01)
*H04N 7/15* (2006.01)

(52) U.S. Cl.
CPC .......... *H04L 65/403* (2013.01); *H04M 3/567* (2013.01); *H04N 7/15* (2013.01)

(58) Field of Classification Search
USPC ............................................ 379/158, 202.01
See application file for complete search history.

(56) References Cited

U.S. PATENT DOCUMENTS

| | | | |
|---|---|---|---|
| 5,694,563 A | 12/1997 | Belfiore et al. | |
| 5,699,082 A | 12/1997 | Marks et al. | |
| 5,745,711 A | 4/1998 | Kitahara et al. | |
| 5,767,897 A | 6/1998 | Howell | |
| 5,825,858 A | 10/1998 | Shaffer et al. | |
| 5,874,962 A | 2/1999 | de Judicibus et al. | |
| 5,995,096 A | 11/1999 | Kitahara et al. | |
| 6,040,817 A | 3/2000 | Sumikawa | |
| 6,075,531 A | 6/2000 | DeStefano | |
| 6,191,807 B1 | 2/2001 | Hamada et al. | |
| 6,300,951 B1 | 10/2001 | Filetto et al. | |
| 6,392,674 B1 | 5/2002 | Hiraki et al. | |
| 6,554,433 B1 | 4/2003 | Holler | |
| 6,573,913 B1 | 6/2003 | Butler et al. | |
| 6,646,997 B1 | 11/2003 | Baxley et al. | |
| 6,754,321 B1 | 6/2004 | Innes et al. | |
| RE38,609 E | 10/2004 | Chen et al. | |
| 7,062,532 B1 | 6/2006 | Sweat et al. | |
| 7,124,164 B1 | 10/2006 | Chemtob | |
| 7,418,664 B2 | 8/2008 | Ben-Shachar et al. | |
| 7,441,198 B2 | 10/2008 | Dempski et al. | |
| 7,478,339 B2 | 1/2009 | Pettiross et al. | |
| 7,530,022 B2 | 5/2009 | Ben-Shachar et al. | |
| 7,620,902 B2 | 11/2009 | Manion et al. | |
| 7,634,533 B2 | 12/2009 | Rudolph et al. | |
| 7,881,450 B1 | 2/2011 | Gentle et al. | |
| 7,920,160 B2 | 4/2011 | Tamaru et al. | |
| 7,956,869 B1 | 6/2011 | Gilra | |
| 8,290,998 B2 | 10/2012 | Stienhans et al. | |
| 8,340,268 B2 | 12/2012 | Knaz | |
| 8,358,327 B2 | 1/2013 | Duddy | |
| 8,428,234 B2 | 4/2013 | Knaz | |
| 8,434,019 B2 | 4/2013 | Nelson | |
| 8,456,507 B1 | 6/2013 | Mallappa et al. | |
| 8,462,103 B1 | 6/2013 | Moscovitch et al. | |
| 8,478,848 B2 | 7/2013 | Minert | |
| 8,630,208 B1 | 1/2014 | Kjeldaas | |
| 8,638,354 B2 | 1/2014 | Leow et al. | |
| 8,675,847 B2 | 3/2014 | Shaffer et al. | |
| 8,694,587 B2 | 4/2014 | Chaturvedi et al. | |
| 8,694,593 B1 | 4/2014 | Wren et al. | |
| 8,831,505 B1 | 9/2014 | Seshadri | |
| 8,890,924 B2 | 11/2014 | Wu | |
| 8,892,646 B2 | 11/2014 | Chaturvedi et al. | |
| 8,924,862 B1 | 12/2014 | Luo | |
| 8,930,840 B1 | 1/2015 | Riskó et al. | |
| 9,031,839 B2 | 5/2015 | Thorsen et al. | |
| 9,032,028 B2 | 5/2015 | Davidson et al. | |
| 9,143,729 B2 | 9/2015 | Anand et al. | |
| 9,197,701 B1 | 11/2015 | Petrov et al. | |
| 9,197,848 B2 | 11/2015 | Felkai et al. | |
| 9,201,527 B2 | 12/2015 | Kripalani et al. | |
| 9,204,099 B2 | 12/2015 | Brown | |
| 9,268,398 B2 | 2/2016 | Tipirneni | |
| 9,298,342 B2 | 3/2016 | Zhang et al. | |
| 9,323,417 B2 | 4/2016 | Sun et al. | |
| 9,335,892 B2 | 5/2016 | Ubillos | |
| 9,349,119 B2 | 5/2016 | Desai et al. | |
| 9,367,224 B2 | 6/2016 | Ananthakrishnan et al. | |
| 9,432,512 B2 | 8/2016 | You | |
| 9,449,303 B2 | 9/2016 | Underhill et al. | |
| 9,495,664 B2 | 11/2016 | Cole et al. | |
| 9,516,022 B2 | 12/2016 | Borzycki et al. | |
| 9,525,711 B2 | 12/2016 | Ackerman et al. | |
| 9,563,480 B2 | 2/2017 | Messerli et al. | |
| 9,609,030 B2 | 3/2017 | Sun et al. | |
| 9,667,799 B2 | 5/2017 | Olivier et al. | |
| 2002/0076003 A1* | 6/2002 | Zellner ............... G08B 25/08 379/49 |
| 2002/0078153 A1 | 6/2002 | Chung et al. | |
| 2003/0028647 A1 | 2/2003 | Grosu | |
| 2003/0046421 A1 | 3/2003 | Horvitz et al. | |
| 2003/0174826 A1 | 9/2003 | Hesse | |
| 2003/0197739 A1 | 10/2003 | Bauer | |
| 2003/0227423 A1 | 12/2003 | Arai et al. | |
| 2004/0098456 A1 | 5/2004 | Krzyzanowski et al. | |
| 2004/0210637 A1 | 10/2004 | Loveland | |
| 2004/0267938 A1 | 12/2004 | Shoroff et al. | |
| 2005/0014490 A1 | 1/2005 | Desai et al. | |
| 2005/0055405 A1 | 3/2005 | Kaminsky et al. | |
| 2005/0055412 A1 | 3/2005 | Kaminsky et al. | |
| 2005/0085243 A1 | 4/2005 | Boyer et al. | |
| 2005/0099492 A1 | 5/2005 | Orr | |
| 2005/0108328 A1* | 5/2005 | Berkeland et al. ........... 709/204 |
| 2006/0004911 A1 | 1/2006 | Becker et al. | |
| 2006/0026255 A1 | 2/2006 | Malamud et al. | |
| 2006/0164552 A1 | 7/2006 | Cutler | |
| 2006/0250987 A1* | 11/2006 | White et al. .................. 370/260 |
| 2007/0005752 A1 | 1/2007 | Chawla et al. | |
| 2007/0041366 A1 | 2/2007 | Vugenfirer et al. | |
| 2007/0091831 A1 | 4/2007 | Croy et al. | |
| 2007/0100986 A1 | 5/2007 | Bagley et al. | |
| 2007/0116225 A1* | 5/2007 | Zhao ....................... H04M 3/56 379/202.01 |
| 2007/0139626 A1 | 6/2007 | Saleh et al. | |
| 2007/0250567 A1 | 10/2007 | Graham et al. | |
| 2008/0068447 A1 | 3/2008 | Mattila et al. | |
| 2008/0080532 A1 | 4/2008 | O'Sullivan et al. | |
| 2009/0012963 A1 | 1/2009 | Johnson et al. | |
| 2009/0100142 A1 | 4/2009 | Stern et al. | |
| 2009/0193327 A1 | 7/2009 | Roychoudhuri et al. | |
| 2009/0254619 A1 | 10/2009 | Kho et al. | |
| 2009/0256901 A1 | 10/2009 | Mauchly et al. | |
| 2009/0292999 A1 | 11/2009 | LaBine et al. | |
| 2009/0309846 A1 | 12/2009 | Trachtenberg et al. | |
| 2010/0005142 A1 | 1/2010 | Xiao et al. | |
| 2010/0061538 A1 | 3/2010 | Coleman et al. | |
| 2010/0070640 A1 | 3/2010 | Allen, Jr. et al. | |
| 2010/0073454 A1 | 3/2010 | Lovhaugen et al. | |
| 2010/0094867 A1 | 4/2010 | Badros et al. | |
| 2010/0157978 A1 | 6/2010 | Robbins et al. | |
| 2010/0211872 A1 | 8/2010 | Rolston et al. | |
| 2010/0245535 A1 | 9/2010 | Mauchly | |
| 2010/0262925 A1 | 10/2010 | Liu et al. | |
| 2010/0303227 A1 | 12/2010 | Gupta | |
| 2010/0316207 A1 | 12/2010 | Brunson | |
| 2011/0075830 A1 | 3/2011 | Dreher et al. | |
| 2011/0131498 A1 | 6/2011 | Chao et al. | |
| 2011/0264928 A1 | 10/2011 | Hinckley | |
| 2011/0270609 A1 | 11/2011 | Jones et al. | |
| 2011/0271211 A1 | 11/2011 | Jones et al. | |
| 2011/0283226 A1 | 11/2011 | Basson et al. | |
| 2012/0013704 A1 | 1/2012 | Sawayanagi et al. | |
| 2012/0084714 A1 | 4/2012 | Sirpal et al. | |
| 2012/0190386 A1 | 7/2012 | Anderson | |
| 2012/0246229 A1 | 9/2012 | Carr et al. | |
| 2012/0246596 A1 | 9/2012 | Ording et al. | |
| 2012/0284635 A1 | 11/2012 | Sitrick et al. | |
| 2012/0296957 A1 | 11/2012 | Stinson et al. | |
| 2012/0306993 A1 | 12/2012 | Sellers-Blais | |
| 2013/0038675 A1 | 2/2013 | Malik | |
| 2013/0047093 A1 | 2/2013 | Reuschel et al. | |
| 2013/0050398 A1 | 2/2013 | Krans et al. | |
| 2013/0063542 A1 | 3/2013 | Bhat et al. | |
| 2013/0090065 A1 | 4/2013 | Fisunenko et al. | |
| 2013/0091205 A1 | 4/2013 | Kotler et al. | |
| 2013/0091440 A1 | 4/2013 | Kotler et al. | |
| 2013/0135837 A1 | 5/2013 | Kemppinen | |
| 2013/0141371 A1 | 6/2013 | Hallford et al. | |
| 2013/0185672 A1 | 7/2013 | McCormick et al. | |
| 2013/0198629 A1 | 8/2013 | Tandon et al. | |
| 2013/0215215 A1 | 8/2013 | Gage et al. | |

(56) References Cited

U.S. PATENT DOCUMENTS

| | | |
|---|---|---|
| 2013/0219278 A1 | 8/2013 | Rosenberg |
| 2013/0222246 A1 | 8/2013 | Booms et al. |
| 2013/0227433 A1 | 8/2013 | Doray et al. |
| 2013/0290421 A1 | 10/2013 | Benson et al. |
| 2013/0300637 A1 | 11/2013 | Smits et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040819 A1 | 2/2014 | Duffy |
| 2014/0068452 A1 | 3/2014 | Joseph et al. |
| 2014/0078182 A1 | 3/2014 | Utsunomiya |
| 2014/0157338 A1 | 6/2014 | Pearce |
| 2014/0161243 A1 | 6/2014 | Contreras et al. |
| 2014/0237371 A1 | 8/2014 | Klemm et al. |
| 2014/0280595 A1 | 9/2014 | Mani et al. |
| 2014/0282213 A1 | 9/2014 | Musa et al. |
| 2014/0317561 A1 | 10/2014 | Robinson et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0081885 A1 | 3/2015 | Thomas et al. |
| 2015/0085060 A1 | 3/2015 | Fish et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0172120 A1 | 6/2015 | Dwarampudi et al. |
| 2015/0304366 A1 | 10/2015 | Bader-Natal et al. |
| 2015/0319113 A1 | 11/2015 | Gunderson et al. |
| 2015/0373063 A1 | 12/2015 | Vashishtha et al. |
| 2016/0050079 A1 | 2/2016 | Martin De Nicolas et al. |
| 2016/0050175 A1 | 2/2016 | Chaudhry et al. |
| 2016/0072862 A1 | 3/2016 | Bader-Natal et al. |
| 2016/0094593 A1 | 3/2016 | Priya |
| 2016/0110056 A1 | 4/2016 | Hong et al. |
| 2016/0173537 A1 | 6/2016 | Kumar et al. |
| 2016/0182580 A1 | 6/2016 | Nayak |
| 2016/0277461 A1 | 9/2016 | Sun et al. |
| 2016/0309037 A1 | 10/2016 | Rosenberg et al. |
| 2017/0006446 A1 | 1/2017 | Harris et al. |
| 2017/0070706 A1 | 3/2017 | Ursin et al. |
| 2017/0104961 A1 | 4/2017 | Pan et al. |

FOREIGN PATENT DOCUMENTS

| | | |
|---|---|---|
| CN | 102655583 | 9/2012 |
| CN | 102938834 | 2/2013 |
| CN | 103141086 | 6/2013 |
| CN | 204331453 | 5/2015 |
| EP | 0959585 A2 | 11/1999 |
| WO | WO 2012/167262 | 12/2012 |
| WO | WO 2014/118736 | 8/2014 |

OTHER PUBLICATIONS

"Implementing Media Gateway Control Protocols," A RADVision White Paper, Jan. 27, 2012, 16 pp.
Toga, J. and ElGebaly, H., "Demystifying Multimedia Conferencing Over the Internet Using the H.323 Set of Standards," Intel Technology Journal Q2 1998, 11 pp.
"A Primer on the H.323 Series Standard," Version 2.0, http://www.packetizer.com/voip/h323/papers/primer/ Downloaded from the Internet Dec. 20, 2006, 17 pp.
Author Unknown, "Active screen follows mouse and dual monitors," KDE Community Forums, Apr. 13, 2010, 3 pages.
Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).
Cisco Systems, Inc., "Cisco WebEx Meetings Server System Requirements release 1.5." 30 pages, Aug. 14, 2013.
Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed 1011-2013), 2009.
Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).
InFocus, "Mondopad," Mondopad. http://www.infocus.com/sites/default/files/InFocus-Mondopad-INF5520a-INF7- 021-Datasheet-EN.pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert , "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011
Polycom, "Polycom UC Board, Transforming ordinary surfaces into virtual whiteboards" 2012, Polycom, Inc., San Jose, CA, http://www.uatg.com/pdf/polycom/polycom-uc-board- datasheet.pdf, (last accessed Oct. 11, 2013).
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
TNO, "Multi-Touch Interaction Overview," Dec. 1, 2009, 12 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidyo.com/products/vidyopanorama/ dated 2013 (last accessed Oct. 11, 2013).

* cited by examiner

SCALABLE CONFERENCE BRIDGE

RELATED APPLICATIONS

This application is a continuation of U.S. patent application Ser. No. 11/649,528, titled "SCALABLE CONFERENCE BRIDGE," filed on Jan. 3, 2007, the content of which is incorporated by reference herein in its entirety.

BACKGROUND

Technical Field

The present disclosure relates generally to methods and apparatus for processing conference calls.

Description of the Related Art

Participants of a conference call typically connect to a conference via a conference bridge. More particularly, each participant is typically connected to a different port of the conference bridge. In order to ensure that there are sufficient resources for the participants of a conference, the conference bridge typically reserves a specific number of ports for the expected number of participants. However, it is difficult to predict the number of ports that will be needed for a given conference. In addition, since a conference bridge may simultaneously support multiple conferences that may begin and end at different times, it is difficult to divide the resources of the conference bridge among the conferences. Consequently, conferences are often either under or over subscribed, resulting in either a waste of conference resources or an inability of users to join a conference due to insufficient resources.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In accordance with one embodiment, a conference bridge receives a call initiated by a first caller endpoint. The conference bridge identifies a conference to which the call requests entry and determines whether the conference bridge has available resources to process the call. The conference bridge enables the call to join the conference via a second conference bridge associated with a second caller endpoint participating in the conference according to whether the conference bridge has available resources to process the call.

In accordance with another embodiment, a caller endpoint having a conference bridge associated therewith receives a call, the call requesting entry to a conference and being initiated by a caller endpoint. The caller endpoint having the conference bridge determines whether it is connected to the conference. If the caller endpoint having the conference bridge is connected to the conference, the conference bridge connects the caller endpoint that initiated the call to the conference.

Specific Example Embodiments

The disclosed embodiments enable an interested user to join a conference call (i.e., conference), even when a conference bridge that has received a call from the user is unable to connect the user to the conference due to insufficient resources. This is accomplished by enabling the conference bridge to transfer, forward, or otherwise direct the call to another conference bridge. In this manner, conference resources are managed without wasting conference resources.

Figure 1:
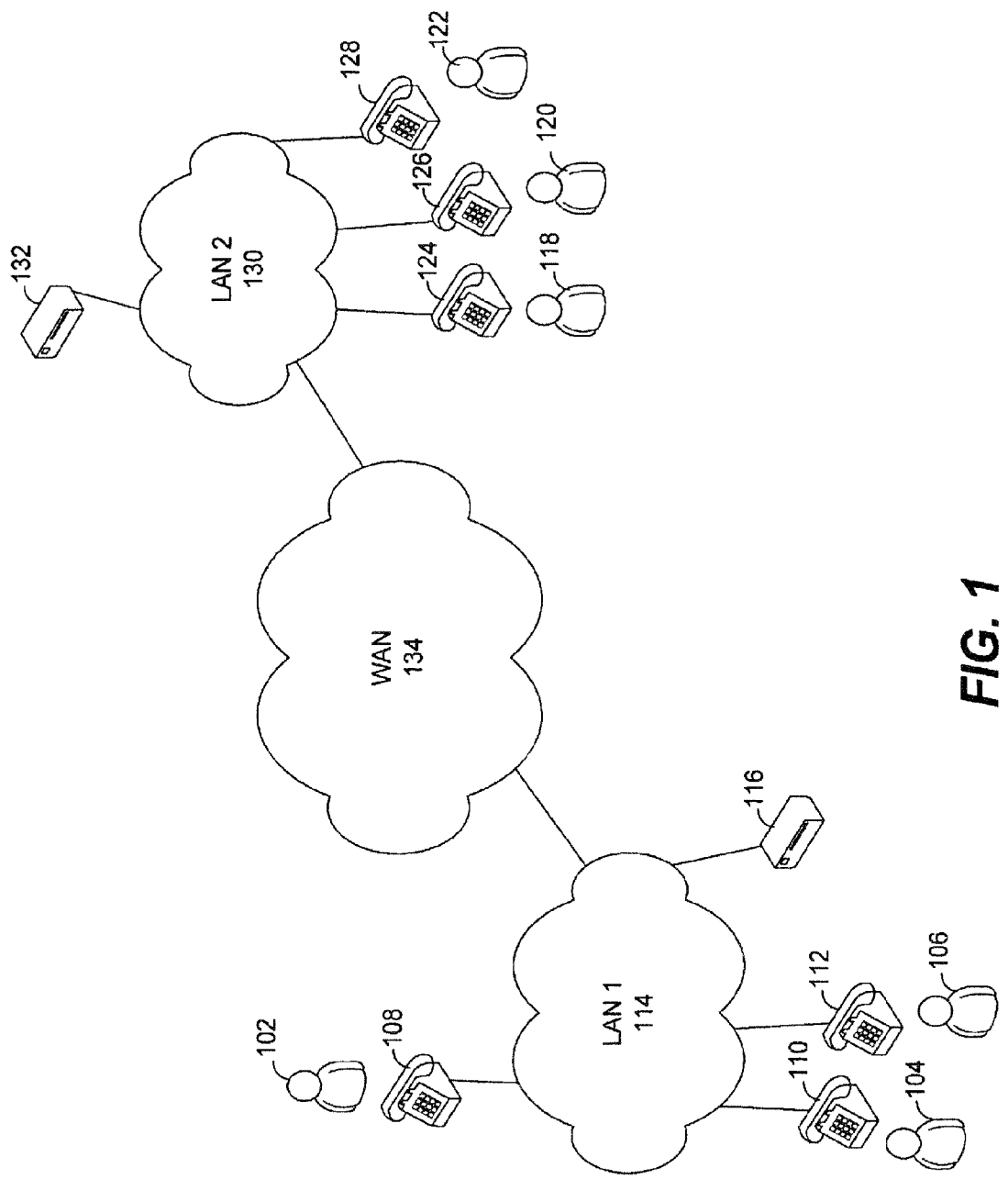
FIG. 1 is a block diagram illustrating an example system for processing conference calls.

FIG. 1 is a block diagram illustrating an example system for processing conference calls. A number of users 102, 104, 106 may attempt to join a conference via corresponding caller endpoints 108, 110, 112, respectively, which are coupled to a network 114 such as a local area network (LAN), shown here as LAN 1. Each of the caller endpoints 108, 110, 112 may be implemented via a device such as a telephone, cellular phone, or other device capable of processing, receiving, and/or transmitting voice signals in accordance with a protocol such as Voice over IP or other suitable protocol. A conference call is typically processed via a conference bridge such as conference bridge 116, which is shown here coupled to LAN 1 114.

Similarly, users 118, 120, 122 may attempt to join the same conference via corresponding caller endpoints 124, 126, 128, respectively, which are coupled to a second network 130 such as LAN 2. Each of the caller endpoints 118, 120, 122 may be implemented via a device such as a telephone, cellular phone, soft phone, or other device capable of processing, receiving, and/or transmitting voice or multimedia signals in accordance with a protocol such as Voice over IP or other suitable protocol. When the users 118, 120, 122 call into the conference, conference bridge 132, shown coupled to the second network, LAN 2 130, may receive the call. A third network 134, which may be a wide area network (WAN), may support communication between the network 114 and the second network 130.

In order to join a conference, a user dials a number that initiates a call to a conference bridge. The user may enter his or her name, meeting identifier, and a password. The conference bridge determines whether it has available resources (e.g., ports) to process the call. If the conference bridge has available resources (e.g., an available port), the conference bridge accepts the call such that the call joins the conference.

For example, user 102 may join the conference, followed by user 104. Upon connecting user 102 and 104 to the conference, the conference bridge 116 may have no further available resources due to other participants to the conference and/or other conferences. Although user 106 also dials in to participate in the conference, the conference bridge 116 is unable to connect another participant to the conference. As a result, the conference bridge 116 transfers, forwards, or otherwise directs the call to another conference bridge. For instance, the conference bridge 116 may identify one or more available conference bridges prior to transferring, forwarding, or otherwise directing the call to one of those conference bridges.

In this example, the conference bridge 116 may direct the call to the conference bridge 132. However, although the conference bridge 132 may have available resources (e.g., ports) to accept the call, the conference bridge 132 is in a different network. As a result, it may be impossible to connect user 106 to the conference via the conference bridge 132. Moreover, connecting user 106 to the conference via the conference bridge 132 would introduce substantial delay. As a result, it may be desirable to connect user 106 to the conference via another conference bridge that is closer to the user 106.

In accordance with one embodiment, one or more caller endpoints such as one or more of the caller endpoints 108, 110, 112 and 124, 126, 128 may include a conference bridge. Thus, the conference bridge 116 may choose one of the available conference bridges of a caller endpoint to connect user 106 to the conference, such as the conference bridge of the caller endpoint 110.

A conference bridge typically includes two components. The first component is a multipoint controller (MC) and the second component is a media processor (MP). The multipoint controller typically performs processing in the control plane, while the media processor typically performs processing in the data plane (e.g., voice or multimedia processing). The MP and the MC may reside on the same network device (e.g., server) or, alternatively, the MP and the MC may reside on different network devices coupled to the network. A conference bridge may operate in accordance with a protocol such as the H.323, Session Initiation Protocol (SIP), or other suitable standard or proprietary protocol.

Figure 2A:
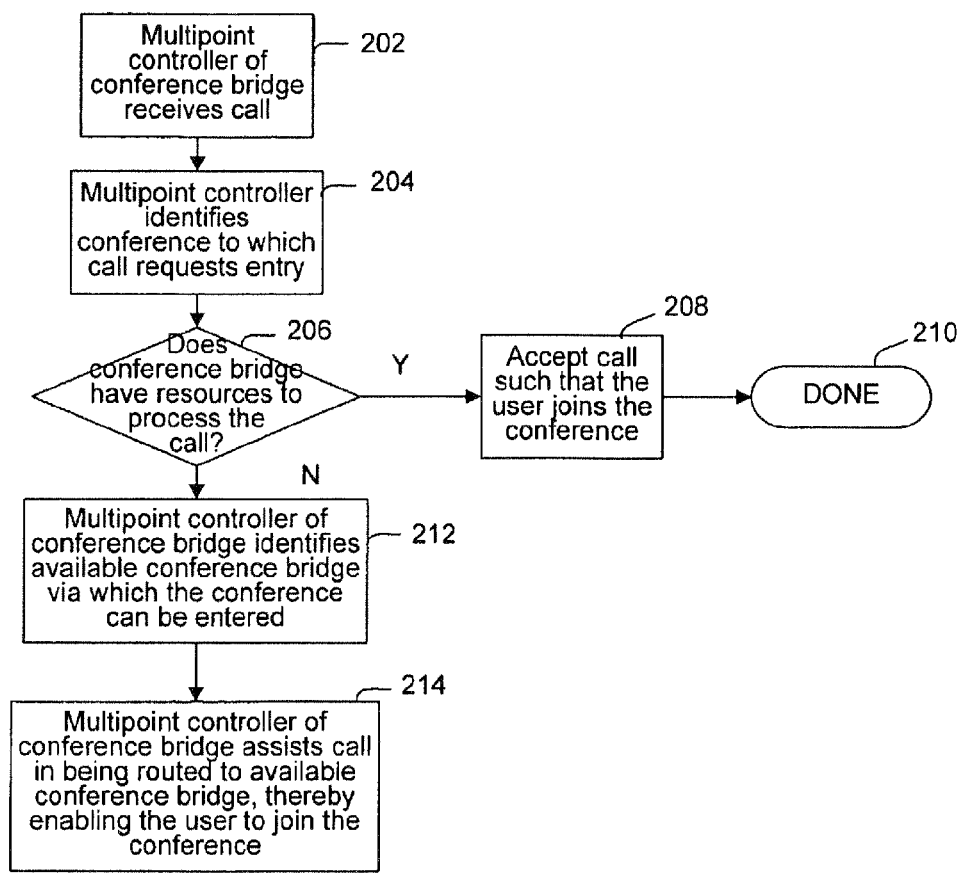
FIGS. 2A-2C together illustrate an example method of processing a call by a conference bridge.
Figure 2B:
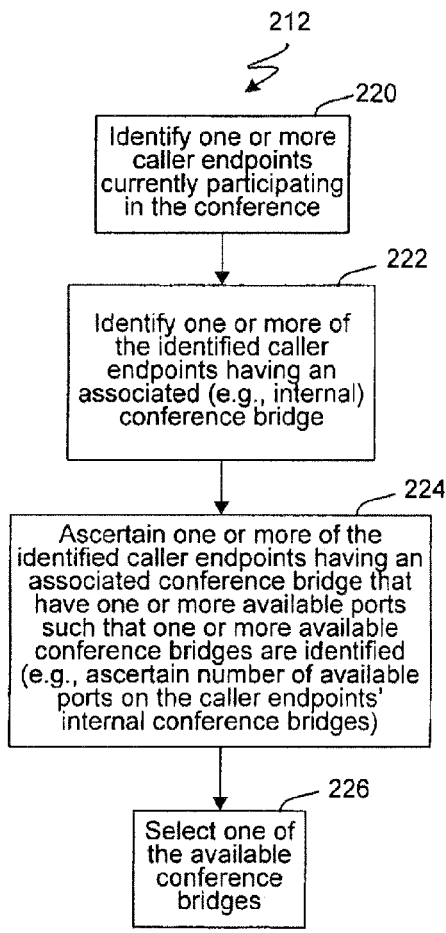
Figure 2C:
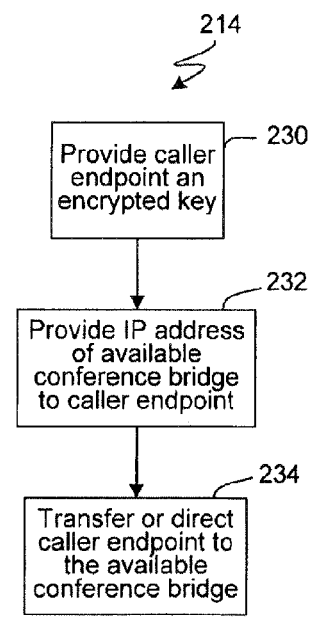

FIGS. 2A-2C together illustrate an example method of processing a call by a conference bridge. As shown in FIG. 2A, when a user attempts to call into the conference via a caller endpoint, a conference bridge receives the call at 202. More particularly, the multipoint controller of the conference bridge may receive the call. When the conference bridge receives the call, the conference bridge may obtain one or more parameters during call setup using a protocol such as the Session Initiation Protocol (SIP). In addition, the conference bridge (e.g., multipoint controller) may also identify the conference to which the user and corresponding call requests entry at 204. More particularly, the conference bridge may identify the conference via a conference identifier entered by the user.

The conference bridge may also determine whether it has available resources to process the call at 206. For instance, the multipoint controller of the conference bridge may determine whether the conference bridge has one or more available ports via which the call may be connected to the conference. The conference bridge may then enable the call to join the conference according to whether the conference bridge has available resources to process the call, as will be described in further detail below. If the conference bridge has available resources to process the call, the conference bridge accepts the call such that the call joins the conference at 208 and the process ends at 210. However, if the conference bridge does not have available resources to process the call, the conference bridge (e.g., multipoint controller) identifies an available conference bridge via which the conference can be entered at 212, as will be described in further detail below with reference to FIG. 2B. The conference bridge (e.g., multipoint controller) may then assist the call in being routed to the available conference bridge at 214, thereby enabling the user to join the conference. An example method of assisting the call in being routed to the available conference bridge will be described in further detail below with reference to FIG. 2C.

FIG. 2B is a process flow diagram illustrating an example method of identifying an available conference bridge via which the conference can be entered as shown at 212 of FIG. 2A. As set forth above, a caller endpoint may have an associated (e.g., internal) conference bridge. Thus, the user may be connected to the conference via a conference bridge of another caller endpoint. However, in accordance with one embodiment, if that caller endpoint (and therefore the internal conference bridge) is not participating in the conference, the associated conference bridge cannot be used to connect to the conference. Thus, the conference bridge may identify one or more caller endpoints currently participating in the conference at 220. For instance, the conference bridge may check a database for the identity of the currently participating caller endpoints in the conference. However, all caller endpoints need not have an associated conference bridge. Thus, the conference bridge may also identify one or more of the identified caller endpoints having an associated conference bridge at 222.

The conference bridge may identify those caller endpoints having an associated conference bridge from data that has previously been configured. The data that has been configured may explicitly identify one or more caller endpoints having an associated conference bridge. Alternatively, the data that has been configured may include data such as the type and/or model of the endpoint from which the existence of an associated conference bridge may be implied.

Alternatively, the conference bridge may identify those caller endpoints having an associated conference bridge from data that has been obtained during call setup that indicates whether a caller endpoint has an associated conference bridge. More particularly, a caller endpoint may notify another device (e.g., caller endpoint or conference bridge) that it has an internal conference bridge as part of a capability exchange. Such a notification may explicitly indicate that the caller endpoint has an internal conference bridge. The notification may also include information such as the type and/or model of the endpoint from which the existence of an internal conference bridge may be implied. In this manner, the notification may indicate that the caller endpoint has conferencing resources that can be made available to the conference bridge, thereby enabling the conference bridge to extend its capacity to process calls that it receives.

Even if a caller endpoint having an associated conference bridge is currently participating in the conference, that caller endpoint may not have available resources at that time. Thus, the conference bridge may ascertain one or more of the identified endpoints having an associated conference bridge that have one or more available ports such that one or more available conference bridges are identified at 224. The conference bridge may then select one of the identified available conference bridges at 226. For instance, the conference bridge may select an available conference bridge via which to connect the user to the conference in accordance with various criteria. Thus, the conference bridge may apply various algorithms to select a conference bridge in accordance with one or more criteria.

Criteria for selecting a conference bridge may include the amount of available resources (e.g., ports). A conference bridge that has received a call may directly or indirectly determine the amount of available resources of another conference bridge. For instance, the conference bridge that has received the call may approximate the amount of resources that are available according to the type and/or model of device having the available conference bridge. More particularly, each type of device typically includes a specific amount of resources (e.g., number of ports). Thus, it may be desirable to identify the type of device in which the available conference bridge is implemented. For instance, the type of device may be identified as part of call set up when a call is received.

It may also be desirable to select a conference bridge in accordance with the quality of the connection that is likely to be established via that conference bridge. The conference bridge that has received a call may determine the quality of the connection that is likely to be established via an available conference bridge based upon voice quality, link quality, quality of service, bandwidth considerations, and/or the distance between the available conference bridge and the caller endpoint that initiated the call. The conference bridge that has received the call may determine link quality by obtaining one or more parameters when the call is received, such as parameters indicating an amount of packet loss or echo. The conference bridge that has received the call may similarly obtain the Quality of Service as a parameter when the call is received. Bandwidth considerations may include the ability to perform bandwidth reservations, the available bandwidth between the various caller endpoints, the available bandwidth between the caller endpoint that initiated the call and the conference bridge that has received the call, and/or the available bandwidth between the conference bridge that has received the call and the available conference bridge being considered. The conference bridge that has received the call may determine voice quality dynamically using a real-time voice quality algorithm such as ITU P.VTQ or P.563. The conference bridge that has received the call may ascertain the distance between the available conference bridge being considered and the caller endpoint that initiated the call by determining the number of hops between the caller endpoint and the available conference bridge. More particularly, the conference bridge that has received the call may determine the number of hops between the caller endpoint and the available conference bridge by adding the number of hops between the caller endpoint and the conference bridge that received the call to the number of hops between the conference bridge that received the call and the available conference bridge being considered. In this manner, the conference bridge may select the closest caller endpoint having an associated conference bridge.

FIG. 2C is a process flow diagram illustrating an example method of assisting a call in being routed to an available conference bridge as shown at 214 of FIG. 2A. In order to ensure that the user has been authorized to access the conference, it may be desirable to generate and/or provide a key for use by the available conference bridge in authenticating the user for entry into the conference. For instance, the conference bridge that has received the call may generate a key or obtain a key corresponding to the user and conference. The conference bridge may use a variety of key distribution protocols such as Transport Layer Security (TLS) protocol to generate and distribute the key to one or more entities, such as the caller endpoint and/or the available conference bridge. In order to protect the key, the conference bridge or entity that has generated the key may encrypt the key. Thus, the conference bridge may provide an encrypted key to the caller endpoint via which the user has attempted to dial into the conference at 230, enabling the caller endpoint to provide the key to the available conference bridge. The conference bridge may also provide a telephone number and/or an IP address of the available conference bridge to the caller endpoint at 232, enabling the caller endpoint to connect to the available conference bridge. The conference bridge may also transfer or otherwise direct the caller endpoint to the available conference bridge at 234. When the call is transferred to the available conference bridge, the conference bridge may provide the identity of the user, password, meeting identifier and/or key to the available conference bridge. Thus, the transfer may be performed automatically and seamlessly.

Figure 3:
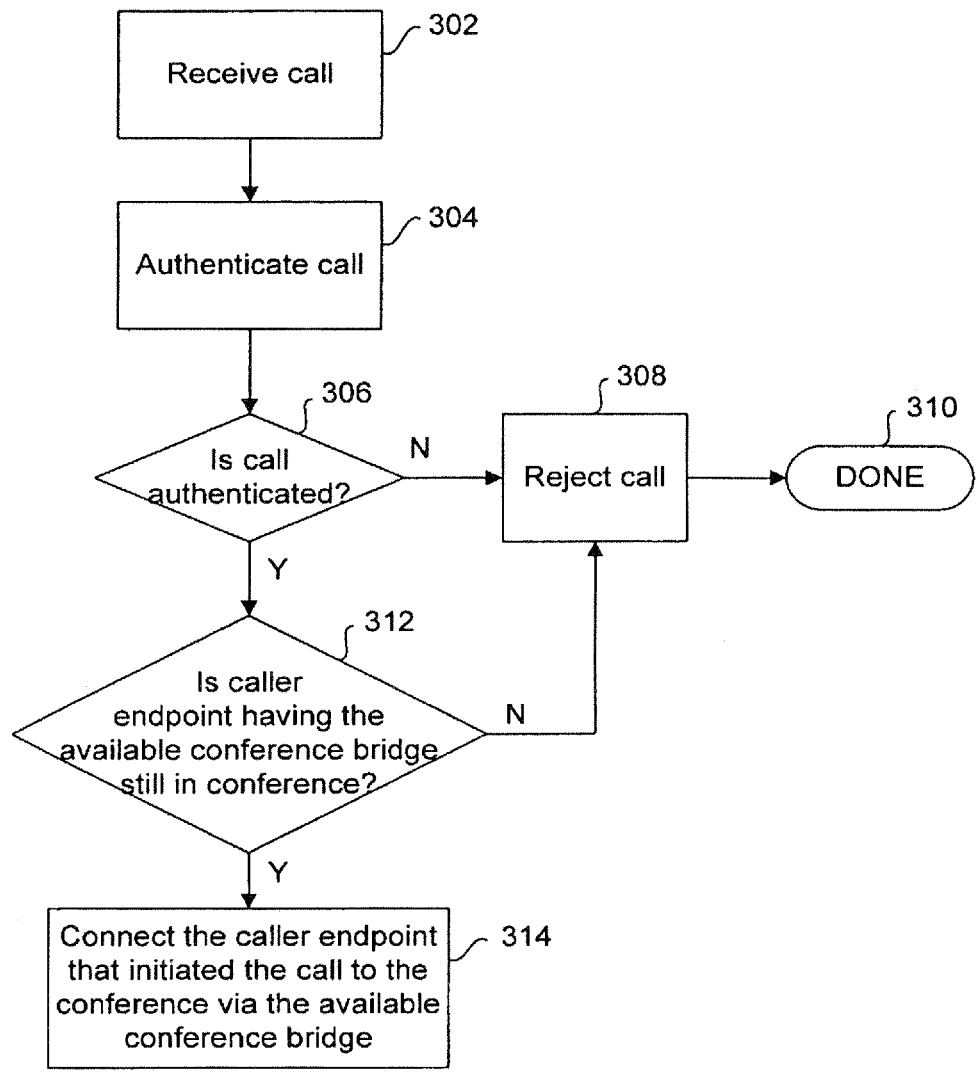
FIG. 3 is a process flow diagram illustrating an example method of processing a call that has been directed to an available conference bridge.

FIG. 3 is a process flow diagram illustrating an example method of processing a call that has been directed to an available conference bridge. As set forth above, the available conference bridge may be internal to a network device such as a caller endpoint. The network device receives the call requesting entry to a conference at 302, where the call was previously initiated by a caller endpoint. The network device may then authenticate the call at 304. More particularly, the network device may perform authentication to ensure that the caller endpoint is authorized to participate in the conference. For example, the network device may authenticate the call using a key associated with the call, as set forth above. The network device may perform authentication internally or by contacting another network device. For instance, the network device may contact another network device adapted for performing authentication. As another example, the network device may perform authentication by contacting the conference bridge via which the call was received. In this manner, the network device may authenticate the caller endpoint for use of its conferencing resources. The network device may determine whether the call has been successfully authenticated at 306. If the call has not been successfully authenticated, the call may be rejected at 308 and the process ends at 310.

Even if the call has been successfully authenticated, it is possible that the caller endpoint having the available conference bridge is no longer connected to the conference. Thus, the network device determines whether the caller endpoint having the available conference bridge is still connected to the conference at 312. In accordance with one embodiment, if the caller endpoint is no longer connected to the conference, the conference bridge of the caller endpoint cannot accept the call. Therefore, the available conference bridge of the caller endpoint may reject the call at 308, and the process ends at 310. Alternatively, the available conference bridge of the caller endpoint may transfer or otherwise direct the call to another available conference bridge in a manner similar to that set forth above with reference to FIGS. 2A-2C.

If the caller endpoint having the available conference bridge is still connected to the conference (and it has available resources to process the call), the available conference bridge connects the caller endpoint that initiated the call to the conference at 314. Thus, the audio or multimedia signals associated with each of the caller endpoints participating in the conference may be "mixed."

As described above, upon receiving a call, a conference bridge may either process that call or transfer the call to an available conference bridge. The available conference bridge may be a conference bridge internal to a caller endpoint. An example of a conference bridge will be described with reference to FIG. 4, while an example of a caller endpoint will be described with reference to FIG. 5.

Figure 4:
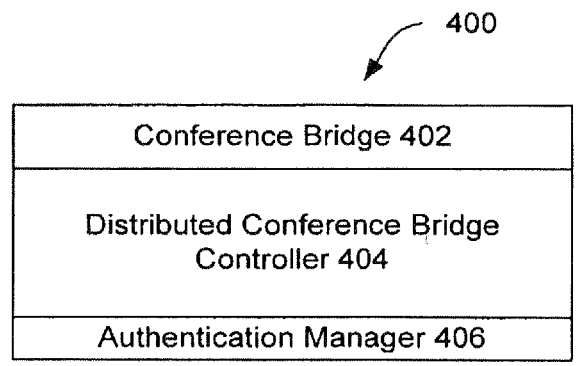
FIG. 4 is an example diagram representing functions that may be performed by a conference bridge.

FIG. 4 is an example diagram representing functions that may be performed by a conference bridge. Conference bridge 400 may include functionalities typically performed by a standard conference bridge 402. The conference bridge 400 may also include a distributed conference bridge controller 404 adapted for performing operations described above with reference to FIGS. 2A-2C. The conference bridge 400 may also include an authentication manager 406.

The authentication manager 406 may generate and/or obtain a key, as well as encrypt the key. The authentication manager 406 may then provide the key to the caller endpoint that has initiated the call and/or the available conference bridge/caller endpoint to which the call is being directed. The conference bridge or caller endpoint to which the call has been directed may request that the authentication manager 406 authenticate the call using the key.

Figure 5:
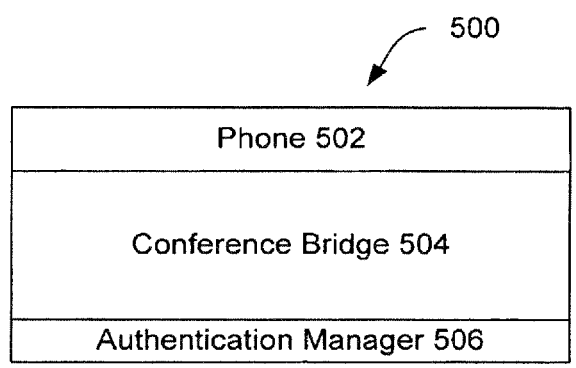
FIG. 5 is an example diagram representing functions that may be performed by a caller endpoint.

FIG. 5 is an example diagram representing functions that may be performed by a caller endpoint. Caller endpoint 500 may include functionalities typically performed by a telephone 502. More particularly, such functionalities may include receiving voice or multimedia signals, processing voice or multimedia signals, and transmitting voice or multimedia signals. For instance, the voice or multimedia signals may be transmitted and received via a standard transmission medium using a protocol such as Voice over IP.

In addition, the caller endpoint 500 may also include or otherwise have associated therewith a conference bridge 504 such as a standard conference bridge (or the functionality of a standard conference bridge) such as a multimedia conference bridge. In some embodiments, the conference bridge 504 includes or has associated therewith a distributed conference bridge controller 404 (not shown) capable of transferring the call to another caller endpoint should the caller endpoint 500 be unable to process the call. The caller endpoint 500 may also include an authentication manager 506.

The authentication manager 506 may authenticate a call that has been transferred to the caller endpoint 500. For instance, the authentication manager 506 may authenticate the call using a key, which may have been encrypted. Thus, the authentication manager 506 may decrypt the key. The authentication manager 506 may authenticate the call internally to the caller endpoint 500 or the authentication manager 506 may authenticate the call by contacting another network device. For instance, the authentication manager 506 may communicate with the conference bridge 400 to request that the call be authenticated.

The above-described embodiments enable a user to gain access to a conference without needing to reserve resources. This is accomplished via an intelligent conference bridge capable of identifying an alternate conference bridge via which the user can connect to the conference. Where the alternate conference bridge is a conference bridge of a caller endpoint, resources associated with conference participants are leveraged. In this manner, conferencing ability may be scaled with the number of caller endpoints participating in a conference.

Various network devices may be configured or adapted for performing the disclosed functionality. These network devices include, but are not limited to, conference bridges, caller endpoints (e.g., telephones) including conference bridges, and soft phones with multimedia conferencing capabilities. Moreover, the functionality for the disclosed processes may be implemented in software, hardware, or any combination of hardware and software.

Yet another embodiment of the invention pertains to computer program products including machine-readable media on which are provided program instructions for implementing the methods and techniques described herein, in whole or in part. Any of the methods described herein may be represented, in whole or in part, as program instructions that can be provided on such machine-readable media. In addition, the disclosed embodiments pertain to various combinations and arrangements of data generated and/or used as described herein. For example, structures having the format described herein and provided on appropriate media are part of this disclosure.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. For instance, a conference call may also include video signals, as well as audio signals. Thus, although various operations are described as being performed by hardware or software, these operations are merely illustrative and therefore these operations may be performed in an alternate manner. Moreover, the disclosed embodiments need not be performed using the steps described above. Accordingly, the disclosed techniques may be performed in an alternate manner, as well as be implemented using other mechanisms and data structures.

In addition, although examples of conference bridges such as multimedia conference bridges and caller endpoints are described, the above-described embodiments may be implemented in a variety of network devices. For instance, a caller endpoint may be any network device capable of processing, transmitting and/or receiving voice or multimedia signals. Accordingly, the present embodiments are to be considered as illustrative and not restrictive, and the disclosed embodiments are not to be limited to the details given herein, but may be modified within the scope and equivalents of the appended claims.

What is claimed is:

1. A method comprising:
receiving at a host server comprising a first multimedia conference bridge hosting a conference call, a call request from a second caller endpoint;
determining, in response to a transfer triggering event, that the first multimedia conference bridge hosting the conference call is unable to accept the call request;
identifying a first caller endpoint that has resources to accept the call request and is connected to the first multimedia conference bridge such that the first caller endpoint can connect to the conference call;
forwarding, from the first multimedia conference bridge to the first caller endpoint, the call request; and
in response to the call request, connecting the second caller endpoint to the conference call via a second multimedia conference bridge at the first caller endpoint based on the connection between the first caller endpoint and the conference call;
wherein the first caller endpoint receives the call request while the first caller endpoint is a participant connected to the conference call.

2. The method of claim 1, wherein the transfer triggering event comprises a determination of a low call quality.

3. The method of claim 1, wherein the call request comprises a conference identifier, and wherein the first caller endpoint comprises one of a telephone, a smartphone, or a soft phone.

4. The method of claim 1, further comprising sending device capabilities of the first caller endpoint to the first multimedia conference bridge, the device capabilities comprising conferencing capabilities.

5. The method of claim 4, wherein the device capabilities comprise a model number of the first caller endpoint and at least one of conferencing resources and an associated network.

6. The method of claim 1, wherein the forwarding further comprises:
providing to the second caller endpoint an IP address of an available conference bridge of the first caller endpoint; and
directing the second caller endpoint to the first caller endpoint.

7. A non-transitory computer-readable storage medium having stored therein instructions which, when executed by a processor, cause the processor to perform operations comprising:
receiving at a host server comprising a first multimedia conference bridge hosting a conference call, a call request from a second caller endpoint;
determining, in response to a transfer triggering event, that the first multimedia conference bridge hosting the conference call is unable to accept the call request;
identifying a first caller endpoint that has resources to accept the call request and is connected to the first multimedia conference bridge such that the first caller endpoint can connect to the conference call;
forwarding, from the first multimedia conference bridge to the first caller endpoint, the call request; and
in response to the call request, connecting the second caller endpoint to the conference call via a second multimedia conference bridge at the first caller endpoint based on the connection between the first caller endpoint and the conference call;
wherein the first caller endpoint receives the call request while the first caller endpoint is a participant connected to the conference call.

8. The non-transitory computer-readable storage medium of claim 7, wherein the transfer triggering event comprises a determination that the first conference bridge does not have available resources to connect the second caller endpoint to the conference call.

9. The non-transitory computer-readable storage medium of claim 7, wherein the transfer triggering event comprises a determination of a low call quality.

10. The non-transitory computer-readable storage medium of claim 7, wherein the transfer triggering event comprises a selection of a network for connecting the second caller endpoint to the conference call, the network being selected based on network characteristics.

11. The non-transitory computer-readable storage medium of claim 7, wherein the conference call comprises a video call, the first caller endpoint having video conference bridging capabilities.

12. The non-transitory computer-readable storage medium of claim 7, wherein the call request comprises a conference identifier, the non-transitory computer-readable storage medium storing additional instructions which, when executed by the processor, result in an operation further comprising sending device capabilities of the first caller endpoint to the first conference bridge, the device capabilities comprising conferencing capabilities.

13. The method of claim 7, wherein the forwarding further comprises:
providing to the second caller endpoint an IP address of an available conference bridge of the first caller endpoint; and
directing the second caller endpoint to the first caller endpoint.

14. A client device comprising:
a processor; and
a computer-readable storage medium having stored therein instructions which, when executed by the processor, cause the processor to perform operations comprising:
receiving from a host server comprising a first multimedia conference bridge hosting a conference call, a call request from a second caller endpoint;
determining in response to a transfer triggering event, that the first multimedia conference bridge hosting the conference call was unable to accept the call request;
identifying a first caller endpoint that has resources to accept the call request and is connected to the first multimedia conference bridge such that the first caller endpoint can connect to the conference call;
forwarding, from the first multimedia conference bridge to the first caller endpoint, the call request; and
in response to the call request, connecting the second caller endpoint to the conference call via a second multimedia conference bridge at the first caller endpoint based on the connection between the first caller endpoint and the conference call;
wherein the first caller endpoint receives the call request while the first caller endpoint is a participant connected to the conference call.

15. The client device of claim 14, wherein the transfer triggering event comprises a determination that the first multimedia conference bridge does not have available resources to connect the first caller endpoint to the conference call.

16. The client device of claim 14, wherein the transfer triggering event comprises a determination of a low call quality.

17. The client device of claim 14, wherein the transfer triggering event comprises a selection of a network for connecting the first caller endpoint to the conference call, the network being selected based on network characteristics.

18. The client device of claim 14, wherein the operations further comprise sending a notification to the first multimedia conference bridge indicating that the client device has an internal conference bridge with video conference bridging capabilities.

19. The client device of claim 14, wherein the call request comprises a conference identifier, the computer-readable storage medium storing additional instructions which, when executed by the processor, result in an operation further comprising sending device capabilities to the first multimedia conference bridge, the device capabilities comprising at least one of conferencing capabilities, conferencing resources, and an associated network.

20. The method of claim 14, wherein the forwarding further comprises:
providing to the second caller endpoint an IP address of an available conference bridge of the first caller endpoint; and
directing the second caller endpoint to the first caller endpoint.

* * * * *